Oct. 26, 1926.

F. VAN NIEUWENHUYZEN 1,604,506

MARKER FOR CORN PLANTERS

Filed August 23, 1922   2 Sheets-Sheet 1

Inventor
Fred Van Nieuwenhuyzen

Oct. 26, 1926.  1,604,506
F. VAN NIEUWENHUYZEN
MARKER FOR CORN PLANTERS
Filed August 23, 1922   2 Sheets-Sheet 2
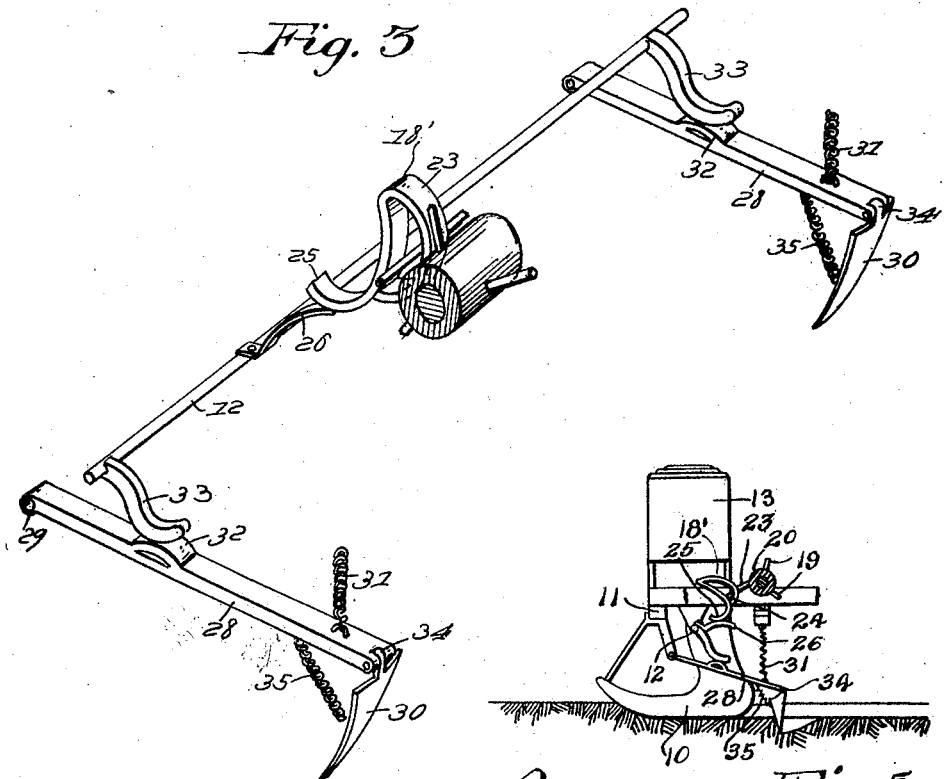
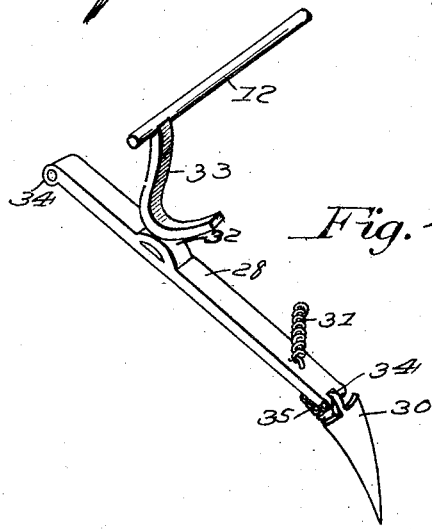
Inventor
Fred Van Nieuwenhuyzen,
By
Attorney Patented Oct. 26, 1926.

1,604,506

UNITED STATES PATENT OFFICE.

FRED VAN NIEUWENHUYZEN, OF PELLA, IOWA.

MARKER FOR CORN PLANTERS.

Application filed August 23, 1922. Serial No. 583,678.

The object of the invention is to provide a corn planting and hill marking mechanism having means readily applicable to a suitable supporting frame or truck for accomplishing the accurate planting of corn or other seed in hills at different intervals in the row without resort to the checking devices commonly used in that connection and under conditions facilitating the setting of the parts to maintain an accuracy in the alignment of the hills transversely of the field to permit of course plowing in cultivation; and with this object in view the invention consists in a construction and combination of parts of which a preferred embodiment is shown in the accompanying drawings, wherein:—

Figure 3 is a perspective view of the operating mechanism for the seed dropping means, more clearly showing the cam faced rocking loop, the hub with the tappet arms, the marker arms, and the shaft for actuating the marker arms.

Figure 4 is a detail perspective view of one of the marker arms, having been depressed by the arm 33 to a greater angle to that shown in Figure 3.

Figure 5 is a detail view of a portion of a corn planter mechanism, showing a marking device applied and illustrating the marker proper as having marked the soil by having made a relatively long gouge or depression in the soil.

Figure 1:
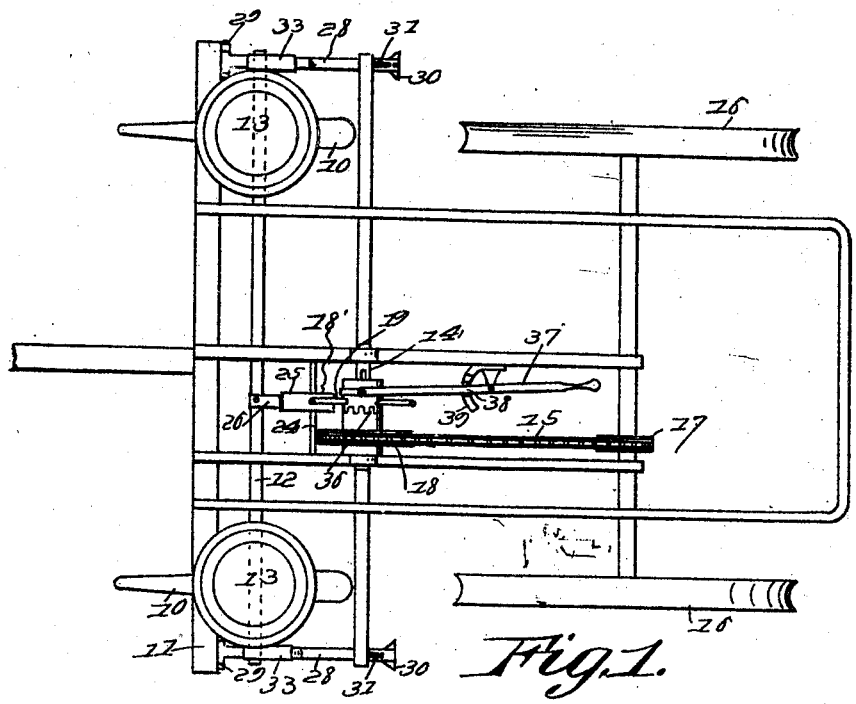
Figure 1 is a plan view of a mechanism embodying the invention.

The apparatus embodies essentially the shoe 10 carried by a suitable frame 11 upon which is mounted a rock shaft 12 serving as a means to control the discharge of corn or other seed from the seed box 13, an operating shaft 14 mounted on the frame in transverse relation to the path of movement and receiving its motion through a drive chain 15 or its equivalent from the ground wheel 16, the said ground wheel carrying a sprocket wheel 17 which is connected by said chain with a sprocket wheel 18 on the operating shaft, and a cam 18′ having operative connection with the rock shaft 12 and actuable by a tappet 19 which is carried by the operating shaft.

Figure 2:
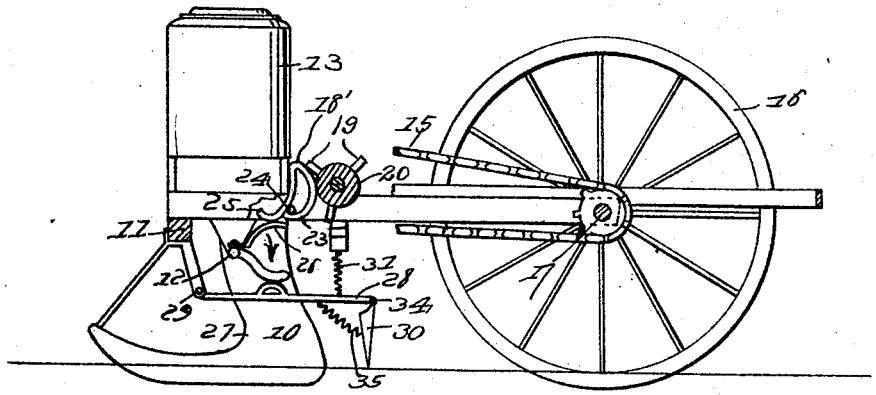
Figure 2 is a side view of the same.

In the construction illustrated the tappet consists of a hub 20 carrying a plurality of radial tappet arms 22 in the path of which the looped portion 23 of the cam 18′ is arranged, said cam being carried by the pivotally mounted stub shaft 24 and having a curved arm 25 for engagement with an operating arm 26 projecting from the rock shaft 12. As each tappet arm comes in contact with the cam and tilts the latter in the direction indicated by the arrow in Figure 2, the arm 25 depresses the arm 26 of the rock shaft and thereby causes the discharge of seed to the spout 27 forming a part of the shoe 10.

In cooperative relation with this planting mechanism there is employed a marker consisting of an arm 28 pivotally mounted at 29 upon the frame of the machine and provided with a foot 30 for engagement with the soil from which it is normally and yieldingly withheld by a spring 31. The arm 28 or preferably a contact block 32 thereof is arranged in the path of the free end of an arm 33 carried by the rock shaft, so that at each operation of the latter the marker arm, normally supported by the spring 31 is depressed to bring its shoe into contact with the ground. The shoe is preferably hinged at its upper end as indicated at 34 and is held in proper position by a spring 35 which is adapted to yield when the lower end of the shoe is in contact with the soil to avoid unnecessarily disturbing the soil or acting as a hoe.

In order to provide for adjusting the planting and marking means to secure an alignment of the hills transversely, as for example in starting a new row, a clutch 36 is employed for communicating motion from the operating shaft 14 to the hub of the tappet, one member of the clutch being formed by said hub and having arranged in operative relation therewith a shifting lever 37 adapted for manual operation and provided with a latch 38 for engagement with a toothed segment 39 whereby the clutch may be secured in either its engaged or disengaged position.

In the operation of the marking mechanism for a corn planter, the operating shaft 14 receives power from the axle 17 through the medium of the sprocket chain 15 and the tappet arms 22 ride consecutively and gradually into and from engagement with the face of the loop portion of the cam 18′, imparting forward oscillating movements to the loop portion. The loop portion constantly functions in cooperation with the tappet arms. In other words, there is a sliding engagement between the arms and the loop portion. The curved arm 25 is in constant engagement with the arm 26 and when the arm 25 depresses the arm 26, the rock shaft 12 receives movement, causing the arms 33 to actuate the marker arms. Due to the gradual camming of the tappet arms against the curved surface of the loop portion, or their sliding engagement therewith, the curved arm 25 holds the arm 26 depressed for a substantial period. As a result of this, the arms 33 hold the marker arms 28 depressed for a substantial period. Obviously, the markers 30 will drag for a substantial period through the soil and thereby insure a substantial indication or marking. As the tappet arms pass the loop portion, the loop portion returns but remains in a position to avoid the binding of the tappet arms against the loop portion. In other words, the loop portion will contact with the hub which carries the tappet arms, as shown clearly in Figure 2, while Figure 5 shows the position of the loop and one of the tappet arms when the tappet arm is in a position about to disengage from the loop portion, showing the long mark made by the foot or marker 30.

Having described the invention, what is claimed as new and useful is:—

In a marking device for planters, the combination with a frame including supporting wheels therefor, of a driven shaft operatively connected with the wheels a hub mounted on said shaft and adapted to be clutched thereto, said hub being provided with radial tappet arms, a stub shaft adjacent said driven shaft, a cam carried by said stub shaft and provided with an arc shaped arm having its convex face presented downwardly, and a loop portion, said loop portion being opposed to said tappet arms and adapted to have gradual sliding engagement therewith, a rock shaft mounted in the frame and provided with a centrally disposed curved operating arm having its convex portion opposed to said arc shaped arm and adapted to have gradual sliding engagement therewith, a pair of arc shaped arms carried by the extremities of said rock shaft with their convex sides presented downwardly, a pair of marker arms pivotally connected with the frame and provided with upwardly presented semi-circular contact blocks in the path of said arc shaped arms and adapted to have gradual sliding engagement therewith, whereby said marker arms will be gradually downwardly depressed and caused to make an elongated depression in the ground at each actuation of said cam, and means for returning said marker arms to their former position and consequently said arms and cam.

In testimony whereof he affixes his signature.

FRED van NIEUWENHUYZEN.